Feb. 16, 1960 R. L. EASTON 2,925,155
ELECTRIC MOTOR SYSTEM
Filed Aug. 26, 1955 3 Sheets-Sheet 1
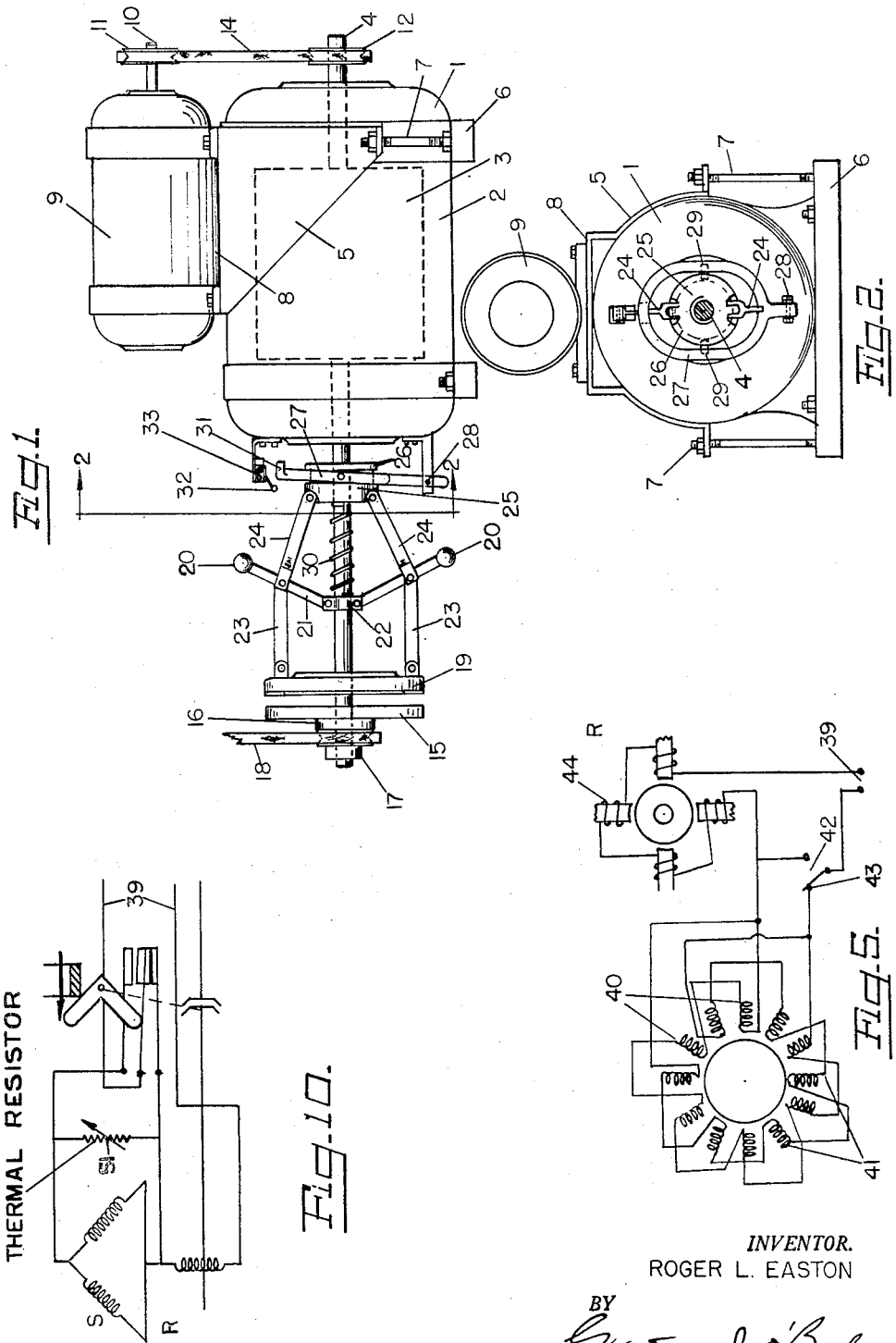
INVENTOR.
ROGER L. EASTON
BY
ATTORNEY Feb. 16, 1960   R. L. EASTON   2,925,155
ELECTRIC MOTOR SYSTEM
Filed Aug. 26, 1955   3 Sheets-Sheet 2
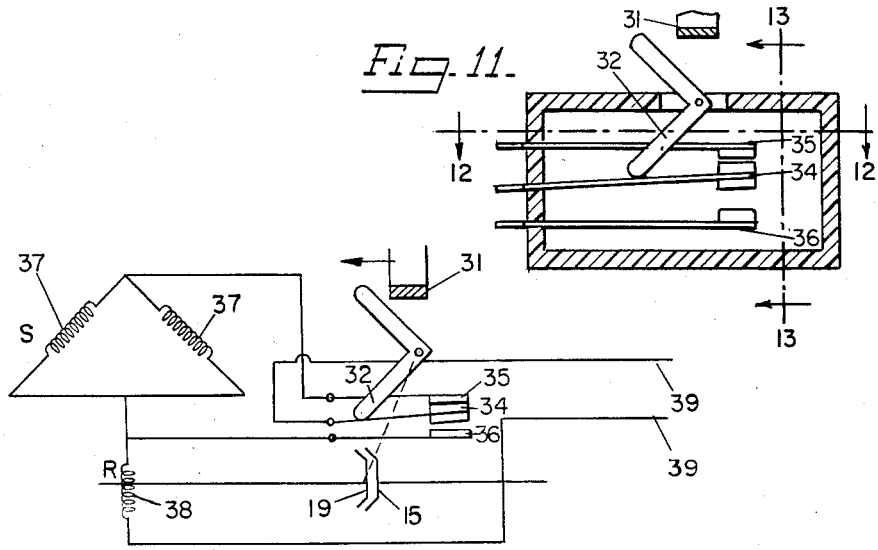
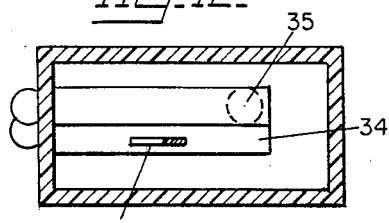
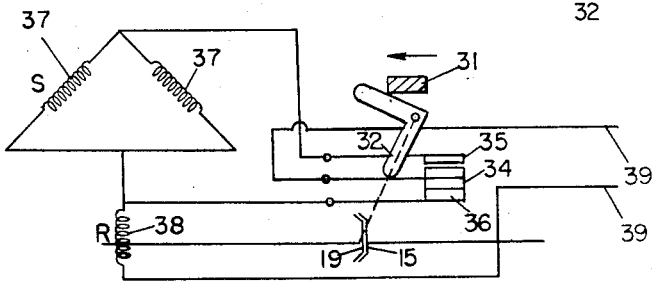
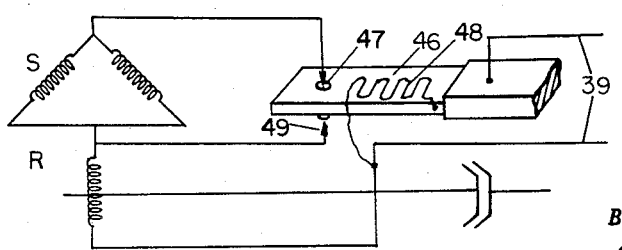
INVENTOR.
ROGER L. EASTON
BY
*Gardner J. O'Boyle*
ATTORNEY Feb. 16, 1960

R. L. EASTON 2,925,155

ELECTRIC MOTOR SYSTEM

Filed Aug. 26, 1955

INVENTOR.
ROGER L. EASTON

BY
ATTORNEY

United States Patent Office 2,925,155
Patented Feb. 16, 1960

2,925,155

ELECTRIC MOTOR SYSTEM

Roger L. Easton, Oxon Hill, Md.

Application August 26, 1955, Serial No. 530,657

3 Claims. (Cl. 192—.02)

My invention relates broadly to electric motors and more particularly to an electric motor assembly in which the starting current is maintained comparable to the running current.

One of the objects of my invention is to provide an electric motor assembly in which a starting motor is associated with a driving motor and wherein the starting motor is employed to bring up the running motor to running speed, and wherein automatic means are provided for transferring the power supply circuits from the starting motor to the running motor when the running motor has been brought up to running speed.

Another object of my invention is to provide an assembly of centrifugal clutch and automatic switch system which coact when a predetermined operating speed is reached in an electric motor system for transferring circuit connections to a power supply system from a starting condition to a running condition.

Still another object of my invention is to provide an electric motor system which includes starting windings and running windings and an assembly of time delay switch whereby the starting windings are initially connected with a power supply system and after a predetermined time interval are automatically cut off from the power supply system and the running windings connected to the power supply system in substitution therefor.

Other and further objects of my invention reside in a motor control system which includes starting windings and running windings associated with a coacting automatic switch and centrifugal clutch whereby the circuit connections between a power supply system and the starting and running windings may be automatically controlled according to conditions of speed of the motor system, all as set forth more fully in the specification hereinafter following by reference to the accompanying drawings, in which:

Fig. 1 is a side elevational view of one embodiment of my invention;

Fig. 2 is a vertical sectional view taken on line 2—2 of Fig. 1;

Fig. 3 is a schematic diagram, showing the arrangement of the automatic switch and the starting circuit of the motor of Figs. 1 and 2;

Fig. 4 is a schematic view showing the arrangement of the automatic switch and the running circuit of the motor of Figs. 1 and 2;

Figure 6:
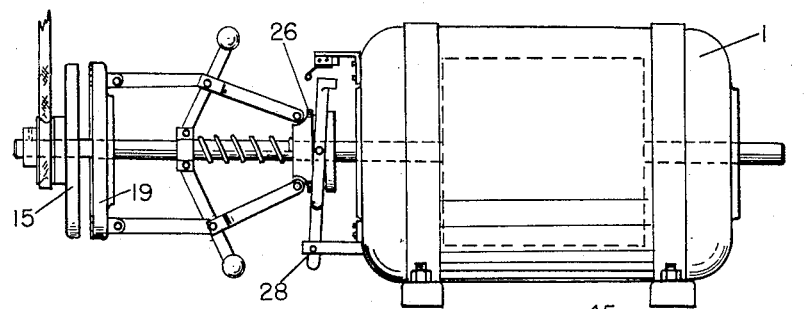
Figure 7:
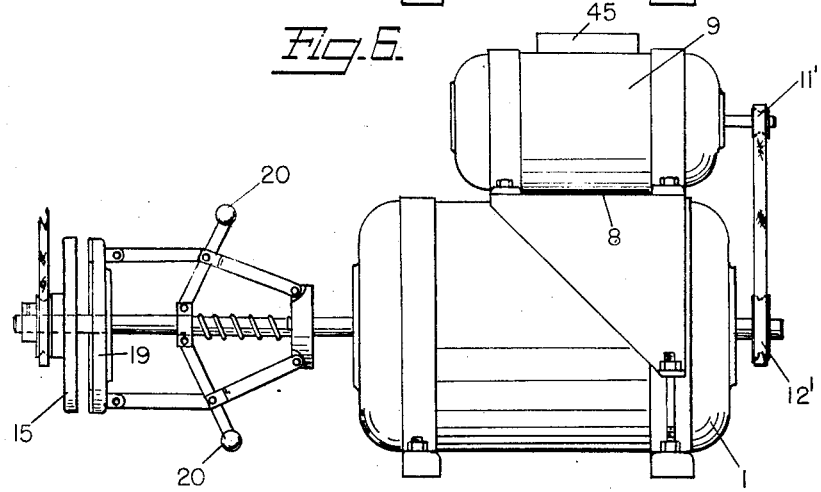
Figure 8:
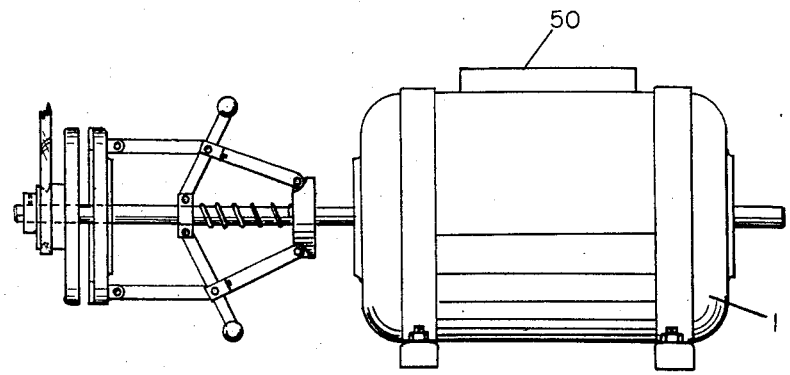

Fig. 5 diagrammatically illustrates the arrangement of the starting and running windings in a unitary motor system;

Fig. 6 shows a modified form of motor system in which a high impedance starting winding is employed on a unitary machine;

Fig. 7 shows another form of the starting and running motor assembly similar to that of Fig. 1, but employing a time delay switching system for selectively connecting the running motor to the power system in lieu of the automatic switch arrangement of Figs. 1 and 6;

Fig. 8 shows a further form of my invention in which a single motor is provided with both starting and running windings controlled by a time delay switch in lieu of the automatic switch of Figs. 1 and 6;

Fig. 9 is a schematic and diagrammatic circuit diagram of the time delay switch arrangement employed in the forms of my invention shown in Figs. 6, 7 and 8;

Fig. 10 is a schematic and diagrammatic circuit of a further modified form of my invention employing a thermal resistor in a shunt path with the starting windings of the motor system;

Fig. 11 is a cross-sectional view through the automatic switch employed in the system of my invention, illustrating the normally biased position of the intermediate leaf springs in the switch;

Fig. 12 is a transverse sectional view taken substantially on line 11—11 through the automatic switch shown in Fig. 11; and Fig. 13 is a transverse sectional view through the automatic switch on line 13—13 of Fig. 11.

My invention is directed to a motor control system which may be variously constructed for application to electric motors of various descriptions including synchronous and asynchronous motors, induction motors, single-phase and multi-phase motors and motors which include a starting winding and a running winding. My invention includes motor assemblies where a small starting motor is mounted upon a large running motor and wherein the starting motor operates at low starting current for bringing up to speed the large running motor.

I provide a centrifugally operated clutch and automatic switch, whereby the starting motor is automatically disconnected from the power supply circuit when the running motor has been brought up to speed and thereafter circuit connections established between the running motor and the power supply system and the load automatically connected to the running motor.

In lieu of the separate starting and running motors I may provide the running motor with separate starting and running windings and effect automatic switching of the windings with respect to the power supply system through an automatic switch and speed controlled centrifugal device which governs the connection of the load to the motor when the motor has been brought up to the required speed. In lieu of the speed control switch I may employ a time delay switch which after the lapse of a predetermined time transfers connections from the starting windings to the running windings and effects through an associated centrifugal controlled clutch the connection of the load to the motor system.

My invention is particularly applicable to motors for driving air conditioners, compressors, air pumps, and water pumps; and is also applicable in other instances where an excessive starting current is to be avoided. By the use of the system of my invention a low starting current is maintained which is generally only slightly greater than the running current. The system of my invention is applicable to motors over a range of the order of one-half H.P. to 40 H.P.

By the system of my invention the starting current in induction squirrel-cage motors, for example, can be reduced to a little more than full load current. The instantaneous starting current of across-the-line induction motors is limited only by the locked impedance of the motor. Starting current is usually taken as 75% of the locked rotor current. For single-phase motors the locked rotor current may be as low as 250% of the full load current for repulsion-start motors or as much as 600% of the full load current for split-phase motors. For multi-phase induction motors the starting current may be four to seven times the full load current, the smaller values being for motors having high resistance rotors.

A high starting current is always undesirable. It makes larger wiring necessary. The motor must be protected by thermal devices instead of simple fuses. In some situations where large starting currents cannot be tolerated reduced voltage starters must be used. These starters may double the cost of a motor installation.

One arrangement of my invention consists of a high speed high inertia motor having a low starting current which, when up to speed, is connected to the motor to be started by means of a clutch. When the second motor with its load is up to speed voltage is applied to it and the first motor is disconnected.

Another arrangement of my invention embodies but one motor. The starting current is reduced by the insertion of resistance in the power leads during the starting period. As the motor speed increases, the resistance is shorted out and the load is connected to the motor by means of a clutch. This method is applicable with large motors. It suffers because the torque of an induction motor varies with the square of the voltage. If the voltage must be reduced to one-sixth to reduce the starting current to the same value as the running current the torque will be one thirty-sixth the full load torque. This available torque may be too small to start the motor even under no load except bearing and clutch friction.

The starting torque may be increased by using an arrangement in which the large power motor is started by a motor, the starting current of which is no greater than full load current of the larger motor. If, as before, the running current is one-sixth the starting current for both motors then the power of the small motor can be one-sixth that of the larger one. Its starting torque may be twice its full load torque or one-third the full load torque of the large motor. An even greater starting torque may be obtained if the starting motor has a high resistance rotor. The starting motor can be either direct-coupled or belt-coupled to the power motor. When the large motor is up to speed, voltage is applied to it and the starting motor is disconnected.

For single-phase installations the two motors (starting and running) may be wired in series. At the instance of start, the larger motor will be nearly a short circuit compared to the smaller motor. When the starting motor is up to speed the running motor will be nearly up to speed and will have some voltage across it. At this point, either by a time delay or a centrifugal switch, the voltage is impressed across the running motor. The load is then connected by means of a clutch.

The methods by which I maintain low starting current in electric motor systems will be more clearly understood by more detailed reference to the drawings wherein, Fig. 1 shows a motor assembly including the running motor 1 having a field system 2 and a rotary armature system 3, for driving the shaft 4. The casing of the running motor 1 provides a support for the housing 5 which snugly fits over the running motor 1 and is fastened to the base 6 of running motor 1 by means of bolts and coacting fastening nuts 7, as shown in Figs. 1, 2 and 7. The housing 5 carries a platform 8 on the top thereof which serves as a mounting means for the starting motor 9. The starting motor 9 is quite small as compared to the running motor 1 and has the drive shaft 10 thereof projecting in spaced parallel relationship to the rotary shaft 4 of running motor 1. The drive pulley 11 on drive shaft 10 of starting motor 9 is aligned with the drive pulley 12 on rotary shaft 4 and connected through drive belt 14.

In the form of my invention shown in Figs. 1 and 2, these drive pulleys 11 and 12 are of the same size, providing a 1:1 driving ratio, while in Fig. 7 there is a different ratio of pulley diameters, the smaller pulley being indicated at 11′ on small motor 9 and the larger pulley being represented at 12′ on the large motor 1. The difference in size of the pulleys 11′ and 12′ limits the speed of motor 1 to less than the speed required to actuate the associated clutch during the time period that the starting motor 9 is accelerating running motor 1.

The rotary shaft 4 extends through the idling clutch member 15 which carries pulley 16 thereon and which is limited in its movement in an axial direction by abutment with bushing 17 fixed to shaft 4. The belt 18 operating over pulley 16 transmits the rotary motion of motor 1 to the load when the longitudinally movable clutch member 19, driven by shaft 4, is moved into a position engaging clutch member 15. The clutch member 19 is shifted longitudinally on shaft 4 for engaging or disengaging clutch member 15 by operation of the centrifugal weights 20 on arms 21 pivoted on the fixed sleeve 22 fastened on shaft 4 and revolvable with the said shaft. The arms 21 connect with sets of links 23 pivotally connected at one end on arms 21 and at the other end on clutch member 19. Sets of links 24 are pivotally connected to arms 21 and extend to pivotal points on the grooved sleeve 25 which is slidable along shaft 4. The grooved sleeve 25 has an annular groove 26 on the periphery thereof around which the yoke member 27 extends. The yoke member 27 is pivotally mounted at its lower end at 28 and is provided with diametrically extending pins 29 which engage the annular groove 26 in the peripheral surface thereof so that the yoke 27 is moved forwardly and backwardly as the centrifugal action on weights 20 varies. A coil spring 30 is interposed between sleeve 25 and the sleeve 22 for biasing clutch member 19 out of engagement with clutch member 15. The upper end of yoke 27 shown at 31 engages the actuator 32 of "microswitch" 33 as shown more clearly in the schematic and diagrammatic views of Figs. 3 and 4. Referring to Figs. 3 and 4 the actuator 32 of the intermediate "microswitch" containing a spring pile-up assembly 34, 35 and 36 is illustrated as being engaged by the upper end of of yoke 31 for moving the leaf spring 34 of "microswitch" 33 from normally biased to closed position shown in Fig. 3, connected with leaf spring 35, and with leaf spring 36 open with the clutch members 15 and 19 open to the position illustrated in Fig. 4, where leaf spring 34 has been moved to a position contacting leaf spring 36, and where the clutch members 19 and 15 have been closed, and where the contact with leaf spring 35 is broken. The two extreme conditions represented in Figs. 3 and 4 are the starting and running positions, respectively. The intermediate leaf spring 34 extends laterally beyond the leaf springs 35 and 36, as shown in Figs. 11–13, sufficiently to permit the engagement of the intermediate leaf spring 34 by one arm of the actuator 32, the other arm of which is controlled by the movement of the yoke 31, that is to say, the switch assembly shown in normal position in Fig. 3 is moved to the actuated position shown in Fig. 4 by the operation of the centrifugal governor constituted by the weights 20, as hereinbefore explained.

The windings at 37 designated by "S" constitute the starting windings of the motor while the windings 38 designated at "R" constitute the running windings of the motor and it will be observed from the condition illustrated in Fig. 3 that initially the running winding 38 is essentially isolated from the power supply circuit 39 with the clutch members 15 and 19 open and only the starting windings 37 connected in circuit from the power supply circuit 39 through leaf springs 34 and 35 to one side of the starting windings 37 and through the running winding 38 acting as a resistive path to the other side of the power supply circuit 39. The current through the sets of windings 37 and 38 in series, while sufficient for the operation of the starting circuit, is insufficient to operate the running circuit. However, as the speed of the running motor 1 accelerates the centrifugal weights cause the shifting of the upper end of yoke 31 and the actuator 32 as represented in Fig. 4, the circuit to the starting windings 37 is opened by movement of leaf spring 34 away from leaf spring 35 and the circuit through leaf spring 36 is closed, thereby directing the current from power supply circuit 39 through running windings 38 with clutch members 15 and 19 closed.

In lieu of the two motors 9 and 1, I may combine the starting and running windings in the same motor as represented in Fig. 5. In this arrangement the starting windings consist of two circuits in parallel consisting of the winding designated at 40 and the intermediate windings 41 disposed between the windings 40. In this arrangement the starting windings 40 and 41 in parallel are initially connected with the power supply circuit 39 through switch 42 establishing connection with contact 43 for bringing the motor up to running speed. The power supply circuit 39 is thereafter switched to the running windings designated in Fig. 5 by 44, whereupon the motor continues to operate at normal running speed. Throughout the accelerating movement and the running condition the current supplied to the windings is not appreciably more than the running current.

In Fig. 6, I have illustrated a motor unit containing the starting and running windings of Fig. 5. It will be noted there is no starting motor but that the single motor 1 provides a unitary casing within which there is mounted the starting and running windings depicted in Fig. 5. In Fig. 7 I have shown a form of my invention similar to that illustrated in Figs. 1 and 2, except that, as heretofore explained, pulleys 11' and 12' are so related that the speed of motor 1 is limited to less than the speed required to engage clutch members 15 and 19 until the running motor 1 has been brought up to speed. In this particular form of my invention a time delay switch 45, of the type illustrated schematically in Fig. 9, is mounted on the top of running motor 9 in the casing 50. This time delay switch initially connects the starting motor 9 to the power supply circuit by reason of the normal bias of the time delay switch arm 46 in Fig. 9 into connection with contact 47. After an initial time period during which thermal winding 48 is energized and during which time the starting motor 9 is accelerating running motor 1, the switch arm 46 is shifted by thermal action into contact with contact 49, thereby cutting off the starting windings in motor 9 and cutting on the running winding in motor 1 to bring motor 1 up to speed and thus actuate centrifugal weights 20 to move clutch member 19 into engagement with clutch member 15 for thus connecting motor 1 to the load. In this instance there is no automatic switch controlled by movement of the governor. Since motor 1 can run for a considerable time at its operating speed and clutch members 15—19 will not be engaged, the exact timing of the delay switch is not critical so long as it is longer than the time required to start the motor 1.

In Fig. 8 I have shown a further modified form of my invention in which the time delay switch is mounted in casing 50 directly on running motor 1. The time delay switch in casing 50 on motor 1 is connected as shown in Fig. 5 where the time delay switch occupies the position shown at 42 in the diagram. Assume that the synchronous speed of the motor 1 is 1800 r.p.m. (4 poles). Now assume that the high impedance starting winding has 6 poles giving a synchronous speed of 1200 r.p.m. Anytime after the starting winding is up to speed, time delay switch 42 is thrown to actuate the running winding and when the required speed is reached, clutch members 15—19 engage for connecting shaft 4 with the load. The automatic switch of the microswitch type controlled by the governor is also omitted in the form of my invention shown in Fig. 8.

In Fig. 10 I have shown a further modified form of the circuit of my invention in which a thermal resistor 51 is connected in shunt with the starting winding and provides an adjustable resistive path across the starting windings during the time period that the power supply circuit 39 is connected therewith. Thermal resistor 51 is useful in gradually shorting out the starting winding to eliminate the effect of momentary surges caused by switching of the power supply voltage to the running motor.

In the forms of my invention shown in Figs. 1, 2 and 6, the centrifugally operated governor trips the automatic switch which switches the power supply from the starting windings to the running windings and engages the clutch members connecting the motor to the load. In the forms of my invention shown in Figs. 7 and 8, the time delay switch may be of the dashpot type in lieu of the type shown in Fig. 9, or a variety of types of time delay switches may be employed.

While I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. An electric motor system comprising an electric motor having a field system, an armature, and a shaft driven by said armature, a yoke associated with said shaft, speed responsive means for displacing said yoke according to the speed of said shaft, separate starting and running windings for said motor, a power source, a series circuit including said starting and running windings, an automatic switch device comprising an actuator member mounted on a pivot and having a pair of actuating arms extending at an angle to each other, a spring pile-up assembly including a pair of spaced leaf springs and an intermediate leaf spring, said intermediate leaf spring being normally biased to a position into contact with one of the aforesaid leaf springs, the arms of said actuator member being normally displaced in position about the pivot thereof, with one of said arms supported by said intermediate leaf spring, which, when biased into contact with the first mentioned one of said leaf springs, positions the other arm of said actuator member into the displacement path of said yoke, said pair of leaf springs and intermediate leaf spring being operative to connect said power source to said starting winding and said running winding in series in said series circuit or to shunt said starting winding and maintain said running winding in circuit with said source, a speed controlled clutch for connecting a load to said shaft substantially simultaneously with the connection of said running winding to said power source.

2. An electric motor system as set forth in claim 1 in which said speed responsive means is a centrifugal governor which operates said speed controlled clutch, said governor maintaining said shaft disengaged from said load during the connection of said series circuit including said starting and running windings to the power source while establishing connection between said shaft and the load while only said running winding is connected with the power source.

3. An electric motor system as set forth in claim 1 in which a thermal resistor is shunted across said starting windings and connected across said power source while said starting windings are energized.

References Cited in the file of this patent

UNITED STATES PATENTS

| | | |
|---|---|---|
| 664,190 | Thomson | Dec. 18, 1900 |
| 786,418 | Cutter | Apr. 4, 1905 |
| 843,981 | Willis | Feb. 12, 1907 |
| 1,512,890 | Holley et al. | Oct. 21, 1924 |
| 1,806,332 | Chryst | May 19, 1931 |
| 1,948,037 | Kingston | Feb. 20, 1934 |
| 2,034,233 | Hasselbaum | Mar. 17, 1936 |
| 2,054,479 | Hoddy | Sept. 15, 1936 |

FOREIGN PATENTS

| | | |
|---|---|---|
| 534,994 | Great Britain | Mar. 25, 1941 |